US010245894B2

(12) United States Patent
Uchida (10) Patent No.: US 10,245,894 B2
(45) Date of Patent: Apr. 2, 2019

(54) PNEUMATIC TIRE

(71) Applicant: The Yokohama Rubber Co., LTD., Minato-ku, Tokyo (JP)

(72) Inventor: Yuta Uchida, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/313,532

(22) PCT Filed: May 20, 2015

(86) PCT No.: PCT/JP2015/064432
§ 371 (c)(1),
(2) Date: Nov. 22, 2016

(87) PCT Pub. No.: WO2015/182449
PCT Pub. Date: Dec. 3, 2015

(65) Prior Publication Data
US 2017/0182849 A1 Jun. 29, 2017

(30) Foreign Application Priority Data
May 26, 2014 (JP) .................................. 2014-108138

(51) Int. Cl.
*B60C 11/04* (2006.01)
*B60C 11/03* (2006.01)
(Continued)

(52) U.S. Cl.
CPC ............ *B60C 11/042* (2013.01); *B60C 11/03* (2013.01); *B60C 11/0304* (2013.01);
(Continued)

(58) Field of Classification Search
CPC ............. B60C 11/1376; B60C 11/1384; B60C 11/1392
See application file for complete search history.

(56) References Cited

U.S. PATENT DOCUMENTS 4,840,210 A 6/1989 Kukimoto
6,719,025 B2 * 4/2004 Caretta .................. B60C 11/18
152/209.5
(Continued)

FOREIGN PATENT DOCUMENTS

CN 102049968 5/2011
CN 103171374 6/2013
(Continued)

OTHER PUBLICATIONS

International Search Report for International Application No. PCT/JP2015/064432 dated Jun. 23, 2015, 4 pages, Japan.

*Primary Examiner* — Kendra Ly
(74) *Attorney, Agent, or Firm* — Thorpe North & Western (57) ABSTRACT

A pneumatic tire includes at least three circumferential grooves extending in the tire circumferential direction in the tread portion, and at least four ribs extending in the tire circumferential direction. In the pneumatic tire, at least two of the ribs including a rib disposed on a first side of the tire equatorial plane in the tire width direction and a rib disposed on a second side protrude to the outer side in the tire radial direction beyond a profile line of a tread surface when viewed in a meridian cross section. The protruding amount decreases in order from the first side to the second side in the tire width direction, and the loss tangent tan δ at 60° C. of the compound in a region where the rib has the least protruding amount is smaller than that in a region of the rib where the protruding amount is the greatest.

14 Claims, 7 Drawing Sheets

(51) Int. Cl.
   *B60C 11/00*     (2006.01)
   *B60C 11/13*     (2006.01)
   *B60C 11/01*     (2006.01)

(52) U.S. Cl.
   CPC ...... *B60C 11/1376* (2013.01); *B60C 11/1392* (2013.01); *B60C 11/04* (2013.01); *B60C 2011/0025* (2013.01); *B60C 2011/013* (2013.01); *B60C 2011/039* (2013.01); *B60C 2011/0341* (2013.01); *B60C 2011/0383* (2013.01); *B60C 2011/0388* (2013.01)

(56)              References Cited

U.S. PATENT DOCUMENTS

| | | |
|---|---|---|
| 2011/0061780 A1 | 3/2011 | Mita |
| 2011/0094639 A1 | 4/2011 | Daisho |
| 2013/0092301 A1 | 4/2013 | Ebiko |
| 2014/0166169 A1* | 6/2014 | Tanaka ................ B60C 11/1376 152/209.15 |

FOREIGN PATENT DOCUMENTS

| | | |
|---|---|---|
| EP | 2 610 075 | 7/2013 |
| JP | 2002-029216 | 1/2002 |
| JP | 2004-122904 | 4/2004 |
| JP | 2005-022622 | 1/2005 |
| JP | 2005-132305 | 5/2005 |
| JP | 2010-221820 | 10/2010 |
| JP | 2011-057141 | 3/2011 |
| JP | 2012-106608 | 6/2012 |
| JP | 2012-116410 | 6/2012 |
| WO | WO 2012/066714 | 5/2012 |

\* cited by examiner

| | CONVENTIONAL EXAMPLE 1 | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|---|
| RIB CONFIGURATION (APPLICABLE DRAWING) | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| FIRST SIDE OUTER RIB — PROTRUDING | - | - | - | - | - | - | PROTRUDING | - | PROTRUDING | PROTRUDING | - | - |
| FIRST SIDE OUTER RIB — PROTRUDING AMOUNT [mm] | - | - | - | - | - | - | 2.0 | - | 3.0 | 2.0 | - | - |
| FIRST SIDE INNER RIB — PROTRUDING | - | - | PROTRUDING | - | PROTRUDING | - | PROTRUDING | PROTRUDING | PROTRUDING | PROTRUDING | PROTRUDING | PROTRUDING |
| FIRST SIDE INNER RIB — PROTRUDING AMOUNT [mm] | - | - | 1.0 | - | 2.0 | - | 1.0 | 2.5 | 2.5 | 1.5 | 2.1 | 2.0 |
| RIB ON TIRE EQUATOR — PROTRUDING | - | PROTRUDING | PROTRUDING | PROTRUDING | PROTRUDING | PROTRUDING | PROTRUDING | PROTRUDING | PROTRUDING | PROTRUDING | PROTRUDING | PROTRUDING |
| RIB ON TIRE EQUATOR — PROTRUDING AMOUNT [mm] | 0.04 | 0.04 | 0.04 | 0.04 | 1.0 | 2.0 | 0.04 | 2.0 | 2.0 | 1.0 | 1.0 | 0.05 |
| SECOND SIDE INNER RIB — PROTRUDING | - | - | - | - | PROTRUDING | PROTRUDING | - | PROTRUDING | PROTRUDING | PROTRUDING | - | - |
| SECOND SIDE INNER RIB — PROTRUDING AMOUNT [mm] | - | - | - | 0.04 | 0.04 | 1.0 | - | 1.0 | 1.0 | 0.5 | - | - |
| SECOND SIDE OUTER RIB — PROTRUDING | - | - | - | - | - | PROTRUDING | - | - | PROTRUDING | PROTRUDING | - | - |
| SECOND SIDE OUTER RIB — PROTRUDING AMOUNT [mm] | - | - | - | - | - | 0.04 | - | 0.04 | 0.04 | 0.05 | - | - |
| TANδ AT 60°C OF LARGEST PROTRUDING RIB | - | - | 0.50 | 0.50 | 0.50 | 0.50 | 0.50 | 0.50 | 0.50 | 0.50 | 0.50 | 0.50 |
| TANδ AT 60°C OF SMALLEST PROTRUDING RIB | - | - | 0.30 | 0.30 | 0.30 | 0.30 | 0.30 | 0.30 | 0.30 | 0.30 | 0.30 | 0.30 |
| STEERING STABILITY AT HIGH SPEED | 100 | 100 | 102 | 101 | 103 | 102 | 103 | 104 | 105 | 108 | 103 | 104 |
| DURABILITY AT HIGH SPEEDS WITH A CAMBER | BASELINE | SAME AS BASELINE | +0.25 | SAME AS BASELINE | +0.5 | +0.25 | +0.5 | +0.75 | +1.0 | +2.0 | +0.75 | +0.75 |

FIG. 6

| | EXAMPLE 11 | EXAMPLE 12 | EXAMPLE 13 | EXAMPLE 14 | EXAMPLE 15 | EXAMPLE 16 | EXAMPLE 17 | EXAMPLE 18 | EXAMPLE 19 | EXAMPLE 20 |
|---|---|---|---|---|---|---|---|---|---|---|
| RIB CONFIGURATION (APPLICABLE DRAWING) | FIG. 1 | FIG. 1 | FIG. 1 | FIG. 1 | FIG. 1 | FIG. 1 | FIG. 1 | FIG. 1 | FIG. 1 | FIG. 1 |
| FIRST SIDE OUTER RIB — PROTRUDING | - | - | - | - | - | - | - | - | - | - |
| FIRST SIDE OUTER RIB — PROTRUDING AMOUNT [mm] | - | - | - | - | - | - | - | - | - | - |
| FIRST SIDE INNER RIB — PROTRUDING | PROTRUDING | PROTRUDING | PROTRUDING | PROTRUDING | PROTRUDING | PROTRUDING | PROTRUDING | PROTRUDING | PROTRUDING | PROTRUDING |
| FIRST SIDE INNER RIB — PROTRUDING AMOUNT [mm] | 0.6 | 1.25 | 1.25 | 1.25 | 1.25 | 1.1 | 1.8 | 0.6 | 0.6 | 0.6 |
| RIB ON TIRE EQUATOR — PROTRUDING | PROTRUDING | PROTRUDING | PROTRUDING | PROTRUDING | PROTRUDING | PROTRUDING | PROTRUDING | PROTRUDING | PROTRUDING | PROTRUDING |
| RIB ON TIRE EQUATOR — PROTRUDING AMOUNT [mm] | 0.2 | 1.2 | 1.2 | 1.2 | 1.2 | 1.0 | 1.0 | 0.4 | 0.4 | 0.4 |
| SECOND SIDE INNER RIB — PROTRUDING | - | PROTRUDING | PROTRUDING | PROTRUDING | PROTRUDING | PROTRUDING | PROTRUDING | PROTRUDING | PROTRUDING | PROTRUDING |
| SECOND SIDE INNER RIB — PROTRUDING AMOUNT [mm] | - | 0.2 | 0.2 | 0.2 | 0.2 | 0.9 | 0.2 | 0.2 | 0.2 | 0.2 |
| SECOND SIDE OUTER RIB — PROTRUDING | - | - | - | - | - | - | - | - | - | - |
| SECOND SIDE OUTER RIB — PROTRUDING AMOUNT [mm] | - | - | - | - | - | - | - | - | - | - |
| TANδ AT 60°C OF LARGEST PROTRUDING RIB | 0.35 | 0.50 | 0.05 | 0.40 | 0.35 | 0.35 | 0.35 | 0.33 | 0.33 | 0.37 |
| TANδ AT 60°C OF SMALLEST PROTRUDING RIB | 0.30 | 0.30 | 0.04 | 0.30 | 0.34 | 0.30 | 0.30 | 0.29 | 0.28 | 0.28 |
| STEERING STABILITY AT HIGH SPEED | 105 | 104 | 101 | 105 | 104 | 106 | 107 | 105 | 105 | 107 |
| DURABILITY AT HIGH SPEEDS WITH A CAMBER | +1.0 | +0.75 | +1.5 | +1.5 | +0.75 | +2.0 | +1.5 | +1.75 | +2.0 | +2.0 |

FIG. 7

| | CONVENTIONAL EXAMPLE 2 | COMPARATIVE EXAMPLE 2 | EXAMPLE 21 | EXAMPLE 22 | EXAMPLE 23 | EXAMPLE 24 | EXAMPLE 25 | EXAMPLE 26 | EXAMPLE 27 | EXAMPLE 28 | EXAMPLE 29 | EXAMPLE 30 | EXAMPLE 31 | EXAMPLE 32 | EXAMPLE 33 |
|---|---|---|---|---|---|---|---|---|---|---|---|---|---|---|---|
| RIB CONFIGURATION (APPLICABLE DRAWING) | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 |
| FIRST SIDE OUTER RIB PROTRUDING | - | - | - | PROTRUDING | - | PROTRUDING | PROTRUDING | - | - | - | - | - | - | - | - |
| FIRST SIDE OUTER RIB PROTRUDING AMOUNT [mm] | - | - | - | 2.0 | - | 2.5 | 2.0 | - | - | - | - | - | - | - | - |
| FIRST SIDE INNER RIB PROTRUDING | - | - | PROTRUDING | PROTRUDING | PROTRUDING | PROTRUDING | PROTRUDING | PROTRUDING | PROTRUDING | PROTRUDING | PROTRUDING | PROTRUDING | PROTRUDING | PROTRUDING | PROTRUDING |
| FIRST SIDE INNER RIB PROTRUDING AMOUNT [mm] | 0.04 | - | 1.0 | 1.0 | 2.0 | 2.0 | 1.5 | 2.1 | 2.0 | 1.1 | 1.8 | 0.6 | 0.6 | 0.6 | 0.6 |
| RIB ON TIRE EQUATOR PROTRUDING | - | - | - | - | - | - | - | - | - | - | - | - | - | - | - |
| RIB ON TIRE EQUATOR PROTRUDING AMOUNT [mm] | - | - | 0.04 | 0.04 | 1.0 | 1.0 | 1.0 | 1.0 | 0.05 | 1.0 | 1.0 | 0.2 | 0.2 | 0.2 | 0.2 |
| SECOND SIDE INNER RIB PROTRUDING | - | - | - | - | PROTRUDING | PROTRUDING | PROTRUDING | - | - | - | - | - | - | - | - |
| SECOND SIDE INNER RIB PROTRUDING AMOUNT [mm] | - | - | - | - | 0.04 | 0.04 | 0.05 | - | - | - | - | - | - | - | - |
| TANδ AT 60°C OF LARGEST PROTRUDING RIB | - | - | 0.50 | 0.50 | 0.50 | 0.50 | 0.50 | 0.50 | 0.50 | 0.50 | 0.35 | 0.50 | 0.33 | 0.33 | 0.37 |
| TANδ AT 60°C OF SMALLEST PROTRUDING RIB | - | - | 0.30 | 0.30 | 0.30 | 0.30 | 0.30 | 0.30 | 0.30 | 0.30 | 0.30 | 0.30 | 0.29 | 0.28 | 0.28 |
| STEERING STABILITY AT HIGH SPEED | 100 | 100 | 102 | 104 | 103 | 105 | 108 | 103 | 104 | 106 | 107 | 105 | 106 | 106 | 107 |
| DURABILITY AT HIGH SPEEDS WITH A CAMBER | BASELINE | SAME AS BASELINE | +0.25 | +0.75 | +0.5 | +1.0 | +2.0 | +0.75 | +0.75 | +2.0 | +2.0 | +1.5 | +1.5 | +2.0 | +2.0 |

FIG. 8

PNEUMATIC TIRE

TECHNICAL FIELD

The present technology relates to a pneumatic tire and particularly relates to a pneumatic tire having enhanced steering stability at high speeds and durability at high speeds with a camber.

BACKGROUND ART

Conventionally, pneumatic tires with an object of securing straight-line stability are known. For example, the pneumatic tire of Japanese Unexamined Patent Application Publication No. 2002-29216 comprises land portions defined by grooves that intersect a tread width direction cross section in the tread portion. When viewed in the tread width direction cross section, the ground contact surface of the land portions is curved so as to protrude to the outer side in the radial direction, and the apex of the ground contact surface closest to the profile line of the tread surface across the entire tread width is offset from the lateral center of the land portion toward one side edge of the land portion by from 0.1 to 0.4 times the width of the land portion.

Also, Japanese Unexamined Patent Application Publication No. 2004-122904, for example, describes a pneumatic tire comprising a tread surface being defined by circumferential grooves into a center land portion extending along the tire equator, an outer land portion extending in the shoulder portion, an intermediate land portion located between the center land portion and the outer land portion. In the pneumatic tire when in a regular state of being assembled on a regular rim, inflated to a regular internal pressure, and having no load applied, when viewed in the tire meridian cross section including the tire axis, the radius of curvature R1 of the outer surface of the center land portion is greater than the radius of curvature R2 of the outer surface of the intermediate land portion, and the center of each radius of curvature R1, R2 lies is at the same position.

Also conventionally, for example in Japanese Unexamined Patent Application Publication No. 2012-116410 describes a pneumatic tire comprising the tread portion being defined into a plurality of land portions extending in the tire circumferential direction by a plurality of longitudinal grooves extending in the tire circumferential direction. In the pneumatic tire, in a meridian cross section that includes the tire axis, the ground contact surface of each land portion includes a center circular arc surface that passes through the center thereof in the tire axial direction and is formed from a single circular arc that protrudes to the outside in the tire radial direction, and an outside circular arc surface connected to the center circular arc surface on at least one side in the tire axial direction formed from a circular arc having a radius of curvature 30 to 50% the radius of curvature of the center circular arc surface. Also, the amount of camber, which is the distance in the tire radial direction between the outer edge in the tire axial direction of the outside circular arc surface and an imaginary line extending the center circular arc surface to the outer edge side of the outside circular arc surface, is 0.5 to 1.5% of the width of the land portion in the tire axial direction.

Also, for example in Japanese Unexamined Patent Application Publication No. 2011-57141 describes a pneumatic tire with a tread pattern that includes land portions sandwiched between grooves in the tire circumferential direction. In the pneumatic tire, the groove area ratios of the tread pattern in the regions on the two sides in the tire width direction sandwiching the tire equator line are different. The land portions have a shape that protrudes to the outside in the tire radial direction. The land portions include land portion edge portions formed by the groove walls of the tire circumferential direction grooves that sandwich the land portions and the surface of the land portions, and that are in contact with the tire circumferential direction grooves. Of the two sides in the tire width direction sandwiching the tire equator line, the side where the groove area ratio is comparatively large is referred to as the first side, and the side where the groove area ratio is relatively small is referred to as the second side. In the land portions, the amount that the position of a first edge portion that is facing towards the first side is depressed in the tire radial direction from the maximum outer diameter position of the land portion is larger compared with the amount that the position of the second edge portion that is facing towards the second side is depressed in the tire radial direction from the maximum outer diameter position of the land portion.

In recent years, in line with improvements in vehicle performance, pneumatic tires that can achieve both steering stability at high speeds and durability at high speeds with a camber have been demanded. To cater to such a demand to ensure steering stability, a pneumatic tire such as that described in Japanese Unexamined Patent Application Publication No. 2002-29216 has been effective. The pneumatic tire of Japanese Unexamined Patent Application Publication No. 2002-29216 a configuration in which a rib (land portion), formed in the tread portion, has a profile that, when viewed in the tire meridian cross section, protrudes to the outer side in the tire radial direction beyond the profile of the tread surface so that the rib has better contact with the ground. However, with a camber to a vehicle, durability at high speeds tends to decrease, in the case of a negative camber. This is because ribs located on the inner side of the tire equator plane when the tire is mounted to a vehicle have a greater footprint length than ribs located on the outer side of the tire equatorial plane. Consequently, achieving both steering stability at high speeds and durability at high speeds with a camber has been difficult. In Japanese Unexamined Patent Application Publication Nos. 2011-57141 and 2012-116410 also, achieving both steering stability at high speeds and durability at high speeds with a camber has been difficult.

Also, the pneumatic tire described in Japanese Unexamined Patent Application Publication No. 2004-122904 is designed for enhanced durability. However, the pneumatic tire is for light trucks. Also, the pneumatic tire has a configuration in which, due to differences in the radius of curvature, the center land portion protrudes to the outer side in the tire radial direction a great deal more than the intermediate land portion. Consequently, in the case of the pneumatic tire being applied to a vehicle with a camber, durability of the center land portion decreases and steering stability also decreases.

SUMMARY

The technology provides a pneumatic tire with both steering stability at high speeds and durability at high speeds with a camber.

The pneumatic tire of the present technology includes: at least four ribs extending in the tire circumferential direction, defined and formed by at least three circumferential grooves extending in the tire circumferential direction in the tread portion thereof. At least two of the ribs include a rib disposed on a first side of the tire equatorial plane in the tire width direction and a rib disposed on a second side thereof that protrude to the outer side in the tire radial direction beyond a profile line of the tread surface when viewed in a meridian cross section. The protruding amount decreases in order from the first side towards the second side in the tire width direction. A cap tread that forms the tread surface of the tread portion is composed from different types of compounds, and the loss tangent tan δ at 60° C. of the compound in the region where the rib has the least protruding amount is smaller than the loss tangent tan δ in the region of the rib where the protruding amount is the greatest.

According to the pneumatic tire, the at least two ribs protrude beyond the profile line with the protruding amount decreasing in order from the first side to the second side. Consequently, with a negative camber, by mounting the tire to a vehicle with the first side corresponding to the vehicle outer side and the second side corresponding to the vehicle inner side, or alternatively with a positive camber, by mounting the tire to a vehicle with the first side corresponding to the vehicle inner side and the second side corresponding to the vehicle outer side, better contact with the ground in the tire width direction is achieved. As a result, increases in steering stability at high speeds are possible. Moreover, with a negative camber, by mounting the tire to a vehicle with the first side corresponding to the vehicle outer side and the second side corresponding to the vehicle inner side, or alternatively with a positive camber, by mounting the tire to a vehicle with the first side corresponding to the vehicle inner side and the second side corresponding to the vehicle outer side, excessive contact with the ground in the tire width direction is alleviated. As a result, the footprint lengths of the respective ribs (the length in the tire circumferential direction of the region of the tread surface that comes into contact with the road surface) are uniformed, which makes it possible to increase durability at high speeds with a camber. Consequently, both steering stability at high speeds and durability at high speeds with a camber can be achieved.

Moreover, according to this pneumatic tire, a cap tread that forms the tread surface of the tread portion is composed from different types of compounds, and the loss tangent tan δ at 60° C. of the compound in the region where the rib that has the least protruding amount is smaller than the loss tangent tan δ in the region of the rib where the protruding amount G is the greatest. Therefore, with a negative camber, by mounting the tire to a vehicle with the first side corresponding to the vehicle outer side and the second side corresponding to the vehicle inner side, or alternatively with a positive camber, by mounting the tire to a vehicle with the first side corresponding to the vehicle inner side and the second side corresponding to the vehicle outer side, heat build-up in the second side where the contact with the ground is high can be reduced by the different types of the compounds from which the cap tread is composed, so the durability during high speed traveling with a camber can be increased.

In addition, the pneumatic tire of the present technology may have a configuration in which the protruding amount beyond the profile line of the ribs is from 0.05 mm to 2.0 mm, both inclusive.

When the protruding amount of the ribs is less than 0.05 mm, the effects of better contact with the ground and uniformity of the footprint lengths are difficult to achieve due to the small protruding amount of the ribs. When the protruding amount of the ribs exceeds 2.0 mm, the effects of better contact with the ground and uniformity of the footprint lengths are difficult to achieve due to the large protruding amount of the ribs. Consequently, when the protruding amount of the ribs is from 0.05 mm to 2.0 mm, both inclusive, both steering stability at high speeds and durability at high speeds with a camber can be significantly achieved.

Also, in the pneumatic tire of the present technology, the loss tangent tan δ at 60° C. of the compound in the region where the rib has the greatest protruding amount is from 0.05 to 0.4, both inclusive, and the loss tangent tan δ in the region of the rib where the protruding amount is the least is from 0.2 to 0.5, both inclusive.

The loss tangent tan δ at 60° C. of the compound in the region where the rib has the greatest protruding amount is from 0.05 to 0.4, both inclusive, and the loss tangent tan δ in the region of the rib where the protruding amount is the least is from 0.2 to 0.5, both inclusive. In this way, an appropriate effect of reduction in heat build-up can be obtained so as the durability when traveling at high speed with a camber is improved without adversely affecting the steering stability during high speed traveling.

In addition, the pneumatic tire of the present technology may have a configuration in which a vehicle inner/outer side orientation when mounted to a vehicle is designated, the protruding amount of the ribs decreases in order from the vehicle outer side to the vehicle inner side, and the loss tangent tan δ at 60° C. of the compound is smaller on the vehicle inner side than the vehicle outer side.

According to the pneumatic tire, in the case of being adapted to high-speed traveling, a negative camber is preferable from the perspective of enhancing steering stability. With a negative camber, a configuration in which the ribs have a protruding amount that decreases in order from the vehicle outer side to the vehicle inner side can significantly achieve the effects of better contact with the ground and uniformity of the footprint lengths. Consequently, both the effects of steering stability at high speeds and durability at high speeds with a negative camber can be significantly achieved. Moreover, by making the loss tangent tan δ at 60° C. of the compound of the cap tread smaller on the vehicle inner side than that on the vehicle outer side, the heat build-up on the second side where the contact with the ground is high with a negative camber can be reduced, so a significant effect of improvement in durability when traveling at high speed with a camber can be obtained.

In addition, the pneumatic tire of the present technology may have a configuration in which the ribs protruding beyond the profile line are provided adjacent to one another interposed by the circumferential groove, and a difference between the protruding amounts of the adjacent ribs is from 0.1 mm to 0.8 mm, both inclusive.

When the difference between the protruding amounts of the adjacent ribs is less than 0.1 mm, the effects of better contact with the ground and uniformity of the footprint lengths are difficult to achieve due to the difference between the protruding amounts of the ribs being too small. When the difference between the protruding amounts of the adjacent ribs exceeds 0.8 mm, the effects of better contact with the ground and uniformity of the footprint lengths are difficult to achieve due to the difference between the protruding amounts of the ribs being too great. Consequently, when the difference between the protruding amounts of the adjacent ribs is from 0.01 mm to 0.8 mm, both inclusive, the effects of both steering stability at high speeds and durability at high speeds with a camber can be significantly achieved. Moreover, by making the loss tangent tan δ at 60° C. of the compound of the cap tread smaller in the region of the rib with the least protruding amount than that in the region where the protruding amount is greatest, the heat build-up on the second side where the contact with the ground is high with a negative camber can be reduced, so a significant effect of improvement in durability when traveling at high speed with a camber can be obtained.

The pneumatic tire according to the present technology can achieve both steering stability at high speeds and durability at high speeds with a camber.

DETAILED DESCRIPTION

An embodiment of the present technology is described in detail below with reference to the drawings. However, the present technology is not limited by the embodiment. Furthermore, components of the embodiment include components that may be easily replaced by those skilled in the art or that are substantially identical to components of the embodiment. Furthermore, a plurality of modified examples described in the embodiment may be combined as desired within the scope apparent to those skilled in the art.

Figure 1:
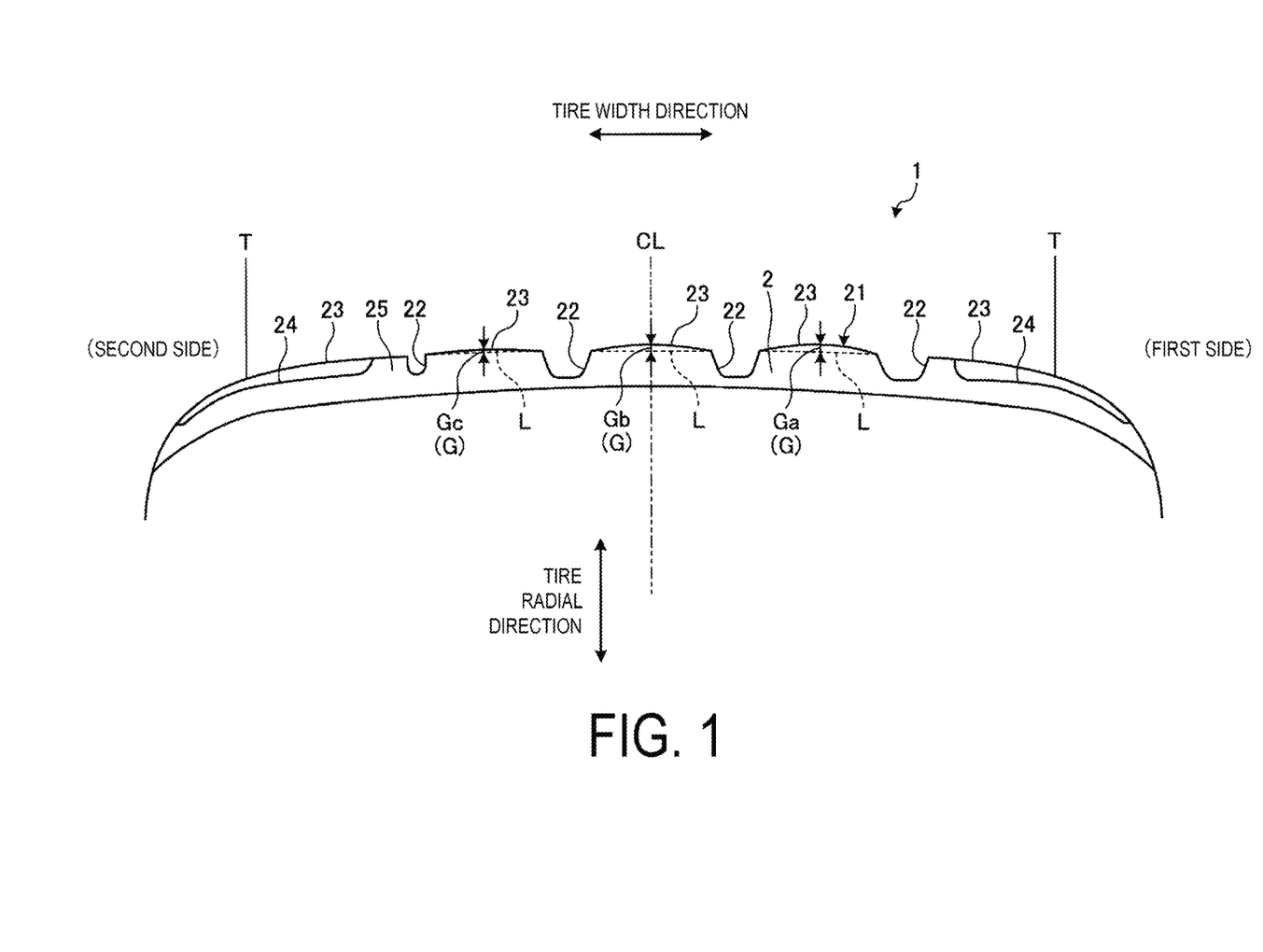
FIG. 1 is a meridian cross-sectional view of the tread portion of the pneumatic tire according to an embodiment of the present technology.
Figure 2:
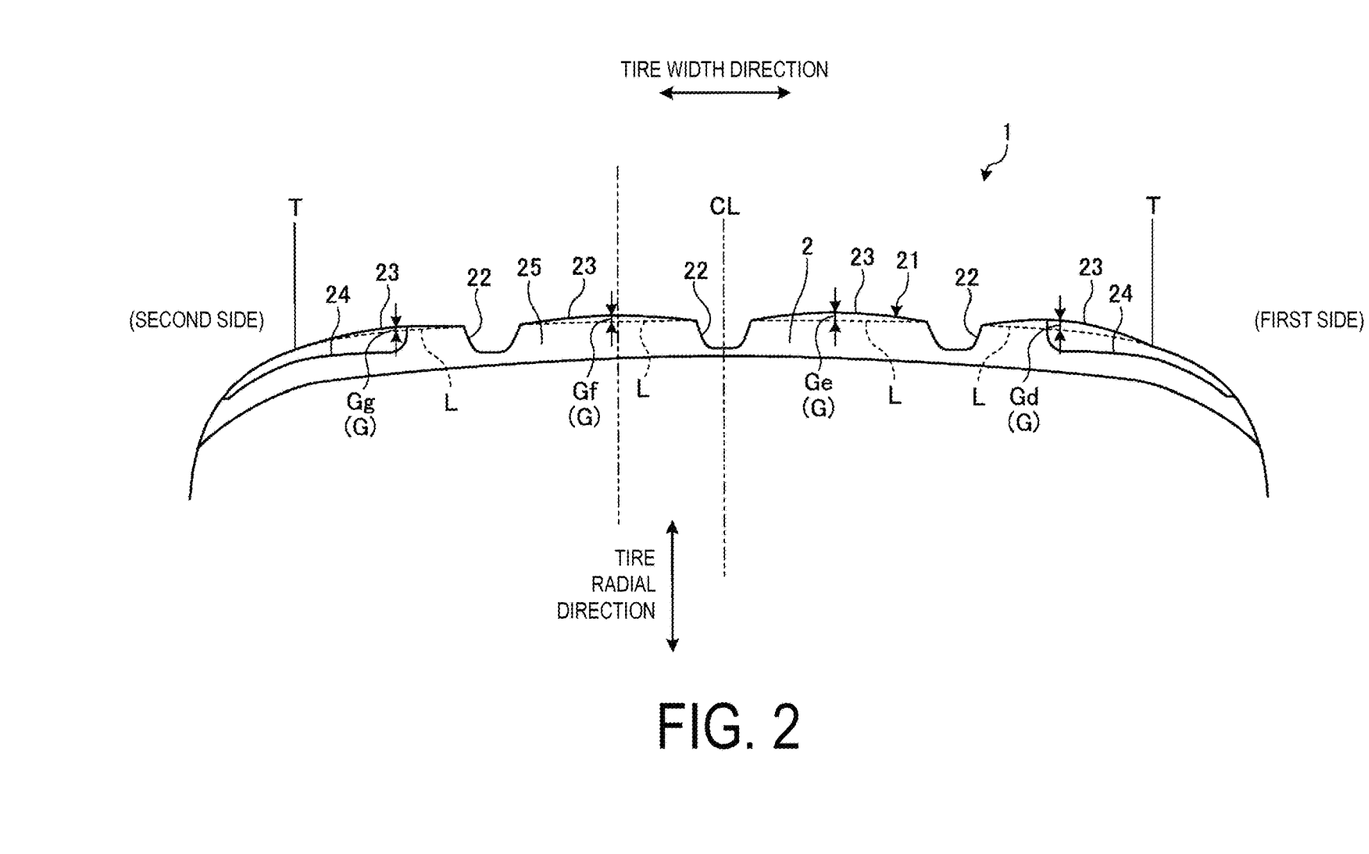
FIG. 2 is a meridian cross-sectional view of the tread portion of the pneumatic tire according to the embodiment of the present technology.
Figure 3:
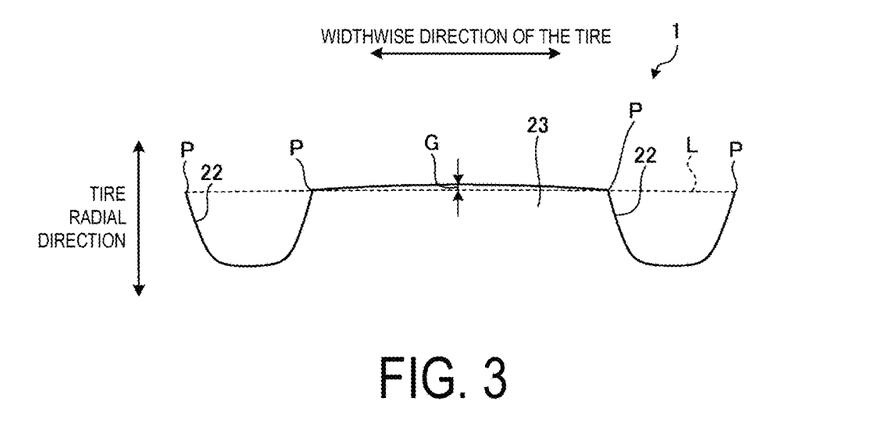
FIG. 3 is an enlarged meridian cross-sectional view of the tread portion of the pneumatic tire according to the embodiment of the present technology.
Figure 4:
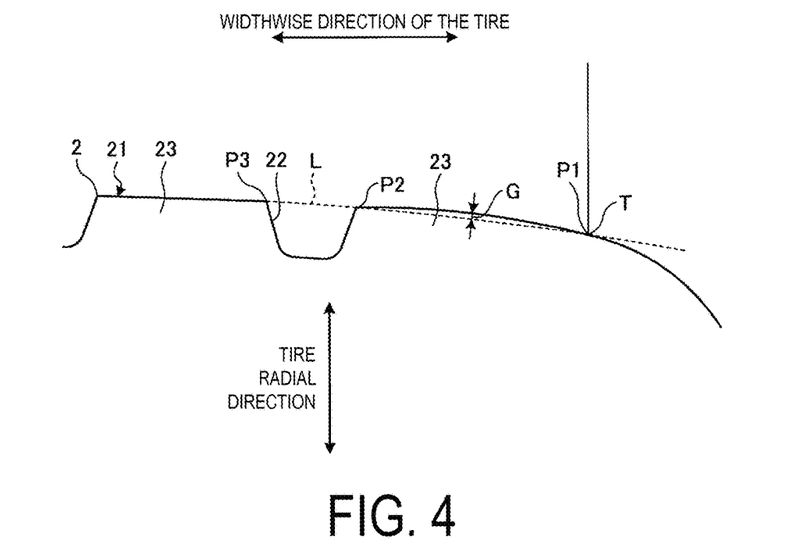
FIG. 4 is an enlarged meridian cross-sectional view of the tread portion of the pneumatic tire according to the embodiment of the present technology.
Figure 5:
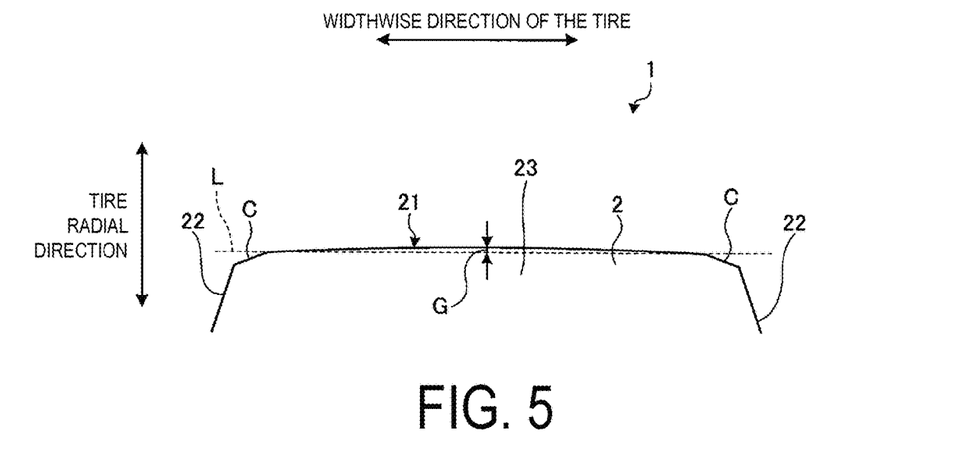
FIG. 5 is an enlarged meridian cross-sectional view of the tread portion of the pneumatic tire according to the embodiment of the present technology.

FIG. 1 and FIG. 2 are meridian cross-sectional views of tread portions of pneumatic tires according to the present embodiment, and FIGS. 3 to 5 are enlarged meridian cross-sectional views of the tread portion of the pneumatic tire according to the present embodiment.

In the following description, "tire radial direction" refers to a direction orthogonal to the rotational axis (not illustrated) of the pneumatic tire 1. "Inner side in the tire radial direction" refers to a side facing the rotational axis in the tire radial direction, and "outer side in the tire radial direction" refers to the side distanced from the rotational axis in the tire radial direction. "Tire circumferential direction" refers to a circumferential direction taking the rotational axis as a center axis. In addition, "tire width direction" refers to a direction parallel to the rotational axis. "Inner side in the tire width direction" refers to a side approximate to a tire equatorial plane CL (tire equatorial line) in the tire width direction, and "outer side in the tire width direction" refers to a side distanced from the tire equatorial plane CL in the tire width direction. "Tire equatorial plane CL" refers to a plane that is orthogonal to the rotational axis of the pneumatic tire 1 and that passes through the center of the pneumatic tire 1 in the tire width direction. "Tire width" is a width in the tire width direction between components located outside in the tire width direction, or in other words, the distance between the components that are most distant in the tire width direction from the tire equatorial plane CL. "Tire equatorial line" refers to a line along the tire circumferential direction of the pneumatic tire 1 that lies on the tire equatorial plane CL. In the present embodiment, the tire equatorial line uses the same reference sign CL as the tire equatorial plane.

In the pneumatic tire 1 of the present embodiment, a tread portion 2 is formed from a rubber material (tread rubber) and exposed on the outermost side of the pneumatic tire 1 in the tire radial direction, as illustrated in FIG. 1 and FIG. 2. The surface of the tread portion 2 corresponds to a profile of the pneumatic tire 1. A tread surface 21 is formed on an outer peripheral surface of the tread portion 2, in other words, on a road contact surface that comes in contact with a road surface during driving. The tread portion 2 is provided with a circumferential groove 22 that opens to the tread surface 21. The circumferential groove 22 has a groove depth from the tread surface 21 to the groove bottom of 5 mm or greater. A plurality of the circumferential grooves 22 (in FIG. 1, four, in FIG. 2, three) are provided in the tire width direction extending next to one another in the tire circumferential direction. Also, in the tread portion 2, a plurality of ribs 23 (in FIG. 1 five, in FIG. 2, four) are defined in the tire width direction by the plurality of circumferential grooves 22 and extend next to one another in the tire circumferential direction. In the ribs 23 of the tread portion 2, a plurality of lug grooves 24 are provided in the tire circumferential direction extending next to one another in a direction that intersects with the circumferential grooves 22. In FIG. 1 and FIG. 2, the lug grooves 24 are only provided in the outermost ribs 23 in the tire width direction. However, lug grooves 24 may also be provided in the other ribs 23. The lug grooves 24 may have a form that communicates with the circumferential grooves 22 or may have a form that does not communicate with the circumferential grooves 22. In addition, when the lug grooves 24 are formed in the outermost ribs 23 in the tire width direction, the lug grooves 24 are formed so as to open to the outer side in the tire width direction. Note that, as illustrated in FIG. 1, when the rib 23 is formed at the tire equatorial plane CL, even if a groove that extends in the tire circumferential direction with a groove depth of 5 mm or greater is formed in the rib 23 formed at the tire equatorial plane CL, the groove is not included as a circumferential groove 22.

Although not illustrated, the pneumatic tire 1 also comprises shoulder portions disposed connected to both outer side portions in the tire width direction of the tread portion 2; sidewall portions connected to the shoulder portions, the sidewall portions being exposed at the outermost positions in the tire width direction of the pneumatic tire 1; and bead portions for engaging with the rim connected to the sidewall portions. Also, although not illustrated, bead cores are provided inside the bead portions of the pneumatic tire 1. The bead cores are formed by winding bead wire (steel wire) in the tire circumferential direction to form a ring. In addition, the pneumatic tire 1 comprises a carcass layer. The carcass layer is folded over the pair of bead cores from the inner side in the tire width direction to the outer side in the tire width direction and wrapped in a toroidal shape in the tire circumferential direction to form the framework of the tire. Furthermore, the pneumatic tire 1 comprises a multilayer structured belt layer in which at least two belt layers are layered. The belt layer is disposed on the outer side in the radial direction, namely on the periphery of the carcass layer, within the tread portion 2.

When such a pneumatic tire 1 is new, at least two of the ribs 23 including a rib 23 disposed on a first side and a rib 23 disposed on a second side in the tire width direction interposed by the tire equatorial plane CL are formed protruding to the outer side in the tire radial direction beyond a profile line L of the tread surface 21 when viewed in the tire meridian cross section. Also, the protruding amount G of the protruding ribs 23 decreases in order from the first side to the second side in the tire width direction. In FIG. 1, an example is illustrated in which the outermost ribs 23 in the tire width direction are formed not protruding, the three ribs 23 each disposed between the circumferential grooves 22 are formed protruding beyond the profile line L, and the relationship between the protruding amounts G from the first side to the second side is such that Ga>Gb>Gc. In the case of FIG. 1, among the three ribs 23, the protruding amounts G of the at least two ribs 23 disposed on the first side and the second side in the tire width direction interposed by the tire equatorial plane CL have the relationships Ga>Gb, Ga>Gc, and Gb>Gc. Also, in FIG. 2, all (four) of the ribs 23 are formed protruding beyond the profile line L, and the relationship between the protruding amounts G from the first side to the second side is such that Gd>Ge>Gf>Gg. In the case of FIG. 2, among the four ribs 23, the protruding amounts G of the at least two ribs 23 disposed on the first side and the second side in the tire width direction interposed by the tire equatorial plane CL have the relationships Gd>Gf, Gd>Gg, Ge>Gf, and Ge>Gg.

Note that in the case that the at least two ribs 23 that protrude beyond the profile line L include the rib 23 disposed on the first side and the rib 23 disposed on the second side in the tire width direction interposed by the tire equatorial plane, the at least two ribs 23 need not be adjacent to each other interposed by the circumferential groove 22. Also, a rib 23 that does not protrude beyond the profile line L may be disposed in the tire width direction between the ribs 23 that protrude beyond the profile line L.

Here, "profile line L" refers to, in the case as illustrated in FIG. 3 of the rib 23 disposed between the circumferential grooves 22, a circular arc drawn at a maximum radius of curvature having a center on the inner side of the tread surface 21 in the tire radial direction and passing through at least three opening edges P of four opening edges P of two adjacent circumferential grooves 22 located on either side of the rib 23 in the tire width direction when viewed in the meridian cross section.

Also, "profile line L" refers to, in the case as illustrated in FIG. 4 of the outermost rib 23 in the tire width direction, a circular arc drawn at a radius of curvature having a center on the inner side of the tread surface 21 in the tire radial direction and passing through P1, P2, and P3; wherein P1 is a ground contact edge T on the outer side, P2 is an opening edge on the outer side in the tire width direction of the circumferential groove 22 adjacent to the outermost rib 23, and P3 is an opening edge on the inner side in the tire width direction of the circumferential groove 22, when viewed in the meridian cross section.

Note that, as illustrated in FIG. 5, when a chamfer C is provided on the opening edge of the circumferential groove 22, the profile line L is defined as described above by taking the most outwardly positioned edge point in the tire radial direction as the opening edge. In FIG. 5, the illustrated rib 23 is disposed between the circumferential grooves 22, however the above holds for the outermost rib 23 in the tire width direction.

Additionally, the "ground contact edge T" refers to both outermost edges in the tire width direction of a region in which the tread surface 21 of the tread portion 2 of the pneumatic tire 1 comes into contact with the road surface when the pneumatic tire 1 is assembled on a regular rim and inflated at regular inner pressure, and a regular load is applied. The ground contact edge T continues in the tire circumferential direction. Also, the ground contact width is the length in the tire width direction between the two ground contact edges T.

Here, "regular rim" refers to a "standard rim" stipulated by the Japan Automobile Tyre Manufacturers Association Inc. (JATMA), a "design rim" stipulated by the Tire and Rim Association, Inc. (TRA), or a "measuring rim" defined by the European Tyre and Rim Technical Organisation (ETRTO). The "regular internal pressure" refers to "maximum air pressure" stipulated by JATMA, a maximum value in "tire load limits at various cold inflation pressures" stipulated by TRA, or "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

Also, in the pneumatic tire 1 as described above, the tread portion 2 includes a cap tread 25 forming the tread surface 21, as illustrated in FIGS. 1 and 2. The cap tread 25 is composed from different types of compounds in the tire width direction, and a plurality of two or more different compounds are arranged aligned in the tire width direction. Then the loss tangent tan δ at 60° C. of the compounds is smaller in the region of the rib 23 with the least protruding amount G than that in the region of the rib 23 with the greatest protruding amount G.

Note that it is sufficient if the loss tangent tan δ at 60° C. of the compounds of the cap tread 25 in the region of the rib 23 where the protruding amount G is greatest and the region of the rib 23 where the protruding amount 23 is the least are different. Also, the boundaries on the cap tread 25 that is composed of different types of compounds are disposed on the groove bottoms of the circumferential grooves 22, or on ribs 23 that do not correspond to the ribs 23 where the protruding amount G is the greatest or the protruding amount G is the least.

Here, the loss tangent tan δ at 60° C. of the compounds is measured on samples extracted from the pneumatic tire 1, and is measured using a viscoelasticity spectrometer under the conditions of temperature 60° C., initial strain 10%, amplitude ±0.5%, and frequency 20 Hz.

In such a manner, the pneumatic tire 1 of the present embodiment comprises the at least three circumferential grooves 22 extending in the tire circumferential direction in the tread portion 2, and the at least four ribs 23 defined by the circumferential grooves 22 extending in the tire circumferential direction. In the pneumatic tire 1, the at least two ribs 23, the rib 23 disposed on the first side and the rib 23 disposed on the second side in the tire width direction interposed by the tire equatorial plane CL, protrude to the outer side in the tire radial direction beyond the profile line L of the tread surface 21 when viewed in the meridian cross section. The protruding amount G of the protruding ribs 23 is formed decreasing in order from the first side to the second side in the tire width direction. The cap tread 25 that forms the tread surface 21 of the tread portion 2 is composed from different types of compounds, and the loss tangent tan δ (Tb) at 60° C. of the compound in the region where the rib 23 has the least protruding amount G is less than the loss tangent tan δ (Ts) in the region of the rib 23 where the protruding amount G is the greatest.

According to the pneumatic tire 1, the at least two ribs 23 protrude beyond the profile line L with the protruding amount G decreasing in order from the first side to the second side. Consequently, with a negative camber, by mounting the tire to a vehicle with the first side corresponding to the vehicle outer side and the second side corresponding to the vehicle inner side, or alternatively with a positive camber, by mounting the tire to a vehicle with the first side corresponding to the vehicle inner side and the second side corresponding to the vehicle outer side, better contact with the ground in the tire width direction is achieved. As a result, increases in steering stability at high speeds are possible. Moreover, with a negative camber, by mounting the tire to a vehicle with the first side corresponding to the vehicle outer side and the second side corresponding to the vehicle inner side, or alternatively with a positive camber, by mounting the tire on a vehicle with the first side corresponding to the vehicle inner side and the second side corresponding to the vehicle outer side, excessive contact with the ground in the tire width direction is alleviated. As a result, the footprint lengths of the respective ribs 23 (the length in the tire circumferential direction of the region of the tread surface 21 that comes into contact with the road surface) are uniformed, which makes it possible to increase durability at high speeds with a camber. Consequently, both steering stability at high speeds and durability at high speeds with a camber can be achieved.

In particular, according to the pneumatic tire 1, the cap tread 25 that forms the tread surface 21 of the tread portion 2 is composed from different types of compounds, and the loss tangent tan δ (Tb) at 60° C. of the compound in the region where the rib 23 has the least protruding amount G is smaller than the loss tangent tan δ (Ta) in the region of the rib 23 where the protruding amount G is the greatest. Therefore, with a negative camber, by mounting the tire to a vehicle with the first side corresponding to the vehicle outer side and the second side corresponding to the vehicle inner side, or alternatively with a positive camber, by mounting the tire to a vehicle with the first side corresponding to the vehicle inner side and the second side corresponding to the vehicle outer side, heat build-up in the second side where the contact with the ground is high can be reduced by the different types of the compounds from which the cap tread is composed, so the durability during high speed traveling with a camber can be increased.

In the pneumatic tire 1 of the present embodiment, the ribs 23 preferably have a protruding amount G of from 0.05 mm to 2.0 mm, both inclusive, from the profile line L.

When the protruding amount G of the ribs 23 is less than 0.05 mm, the effects of better contact with the ground and uniformity of the footprint lengths are difficult to achieve due to the small protruding amount G of the ribs 23. When the protruding amount G of the ribs 23 exceeds 2.0 mm, the effects of better contact with the ground and uniformity of the footprint lengths are difficult to achieve due to the large protruding amount G of the ribs 23. Consequently, when the protruding amount G of the ribs 23 is from 0.05 mm to 2.0 mm, both inclusive, both steering stability at high speeds and durability at high speeds with a camber can be significantly achieved. Note that to achieve a more significant effect of both steering stability at high speeds and durability at high speeds with a camber, the protruding amount G from the profile line L of the ribs 23 is preferably from 0.2 mm to 0.6 mm, both inclusive.

Also, in the pneumatic tire 1 of the present embodiment, preferably the loss tangent tan δ (Ta) at 60° C. of the compound in the region where the rib 23 has the greatest protruding amount G is from 0.05 to 0.4, both inclusive, and the loss tangent tan δ (Tb) in the region of the rib 23 where the protruding amount G is the least is from 0.2 to 0.5, both inclusive.

In addition to satisfying the relationship loss tangent tan δ Ta>Tb, the loss tangent tan δ (Ta) at 60° C. of the compound in the region where the rib 23 has the greatest protruding amount G is from 0.05 to 0.4, both inclusive, and the loss tangent tan δ (Tb) in the region of the rib 23 where the protruding amount G is the least is from 0.2 to 0.5, both inclusive. In this way, an appropriate effect of reduction in heat build-up can be obtained, so the durability when traveling at high speed with a camber is improved without adversely affecting the steering stability during high speed traveling. Note that in order to obtain a more significant effect of both steering stability during high speed traveling and durability during high speed traveling with a camber, preferably the loss tangent tan δ (Ta) at 60° C. of the compound in the region where the rib 23 has the greatest protruding amount G is from 0.25 to 0.4, both inclusive, and the loss tangent tan δ (Tb) in the region of the rib 23 where the protruding amount G is the least is from 0.2 to 0.33, both inclusive.

Also, the pneumatic tire 1 of the present embodiment is preferably such that a vehicle inner/outer side orientation when mounted to a vehicle is designated, the ribs 23 have a protruding amount G that decreases in order from the vehicle outer side to the vehicle inner side, and the loss tangent tan δ at 60° C. of the compound of the cap tread 25 is smaller on the vehicle inner side than that on the vehicle outer side.

The vehicle inner/outer side orientation of such a pneumatic tire 1 may be designated by indicators provided on the sidewall portions, which indicate the vehicle inner/outer side orientation when the pneumatic tire 1 is mounted to a vehicle, for example. Note that the designations of the vehicle inner side and the vehicle outer side are not limited to cases when the tire 1 is mounted to the vehicle. For example, in cases when the tire 1 is assembled on a rim, orientation of the rim with respect to the inner side and the outer side of the vehicle in the tire width direction is predetermined. Therefore, in cases when the pneumatic tire 1 is assembled on a rim, the orientation with respect to the vehicle inner side and the vehicle outer side in the tire width direction is designated.

According to the pneumatic tire 1, in the case of high-speed traveling, a negative camber is preferable from the perspective of enhancing steering stability. With a negative camber, a configuration in which the ribs 23 have a protruding amount G that decreases in order from the vehicle outer side to the vehicle inner side can significantly achieve the effects of better contact with the ground and uniformity of the footprint lengths. Consequently, both the effects of steering stability at high speeds and durability at high speeds with a negative camber can be significantly achieved. Moreover, by making the loss tangent tan δ at 60° C. of the compound of the cap tread 25 smaller on the vehicle inner side than that on the vehicle outer side, the heat build-up on the second side where the contact with the ground is high with a negative camber can be reduced, so a significant effect of improvement in durability when traveling at high speed with a camber can be obtained.

Also, in the pneumatic tire 1 of the present embodiment, the ribs 23 protruding beyond the profile line L are preferably provided adjacent to one another interposed by a circumferential groove 22, and the difference between the respective protruding amounts G of the adjacent ribs 23 is preferably from 0.1 mm to 0.8 mm, both inclusive.

When the difference between the protruding amounts G of the adjacent ribs 23 is less than 0.1 mm, the effects of better contact with the ground and uniformity of the footprint lengths are difficult to achieve due to the difference between the protruding amounts G of the ribs 23 being too small. When the difference between the protruding amounts G of the adjacent ribs 23 exceeds 0.8 mm, the effects of better contact with the ground and uniformity of the footprint lengths are difficult to achieve due to the difference between the protruding amounts G of the ribs 23 being too great. Consequently, when the difference between the protruding amounts G of the adjacent ribs 23 is from 0.1 mm to 0.8 mm, both inclusive, the effects of both steering stability at high speeds and durability at high speeds with a camber can be significantly achieved. Moreover, by making the loss tangent tan δ at 60° C. of the compound of the cap tread 25 smaller in the region of the rib 23 with the least protruding amount G than that in the region where the protruding amount G is the greatest, the heat build-up on the second side where the contact with the ground is high with a negative camber can be reduced, so a significant effect of improvement in durability when traveling at high speed with a camber can be obtained.

In addition, in the pneumatic tire 1 of the present embodiment, the ribs 23 protruding beyond the profile line L are each preferably disposed between the circumferential grooves 22.

In other words, as illustrated in FIG. 1, the ribs 23 protruding beyond the profile line L, which are each disposed between the circumferential grooves 22, are ribs 23 provided on the inner side in the tire width direction, excluding outermost ribs 23 in the tire width direction (shoulder side ribs). These ribs 23 provided on the inner side in the tire width direction protrude to the outer side in the tire radial direction beyond the profile line L, and the protruding amount G decreases in order from the first side to the second side in the tire width direction. This configuration contributes greatly to achieving the effects of better contact with the ground and uniformity of the footprint lengths. Consequently, the effects of both steering stability at high speeds and durability at high speeds with a camber can be significantly achieved. Moreover, by making the loss tangent tan δ at 60° C. of the compound of the cap tread 25 smaller in the region of the rib 23 with the least protruding amount G than that in the region where the protruding amount G is the greatest, the heat build-up on the second side where the contact with the ground is high with a negative camber can be reduced, so a significant effect of improvement in durability when traveling at high speed with a camber can be obtained.

Examples

Figure 6:
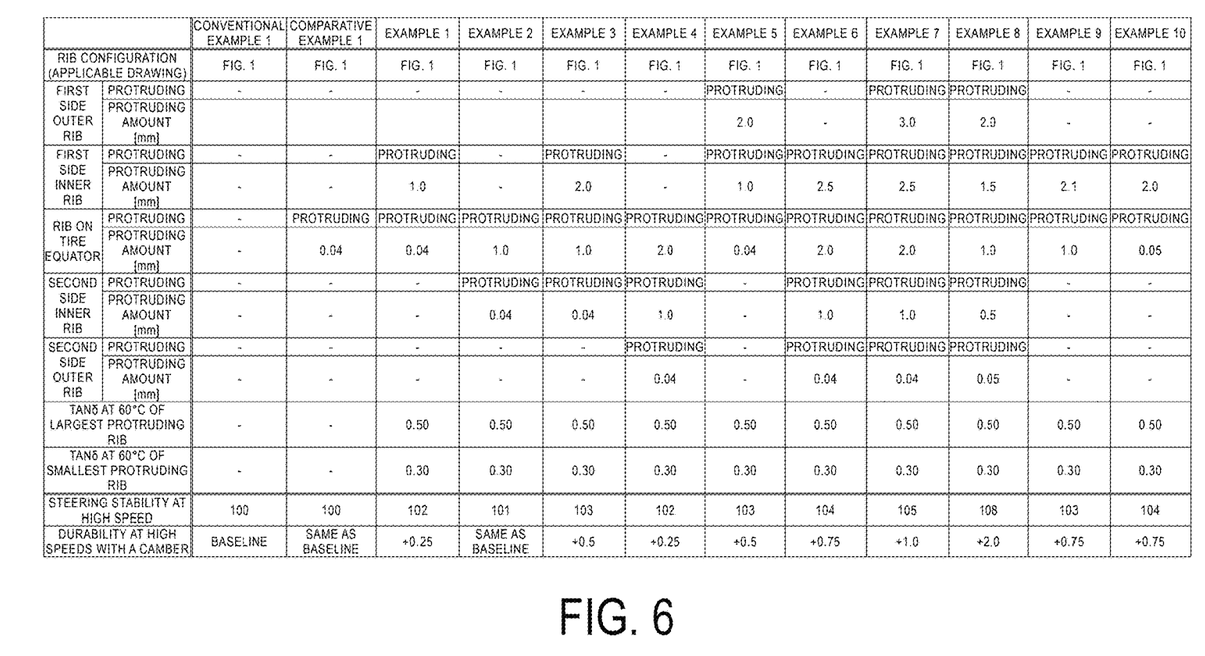
FIGS. 6A-6B is a table showing results of performance tests on pneumatic tires according to examples of the present technology.
Figure 7:
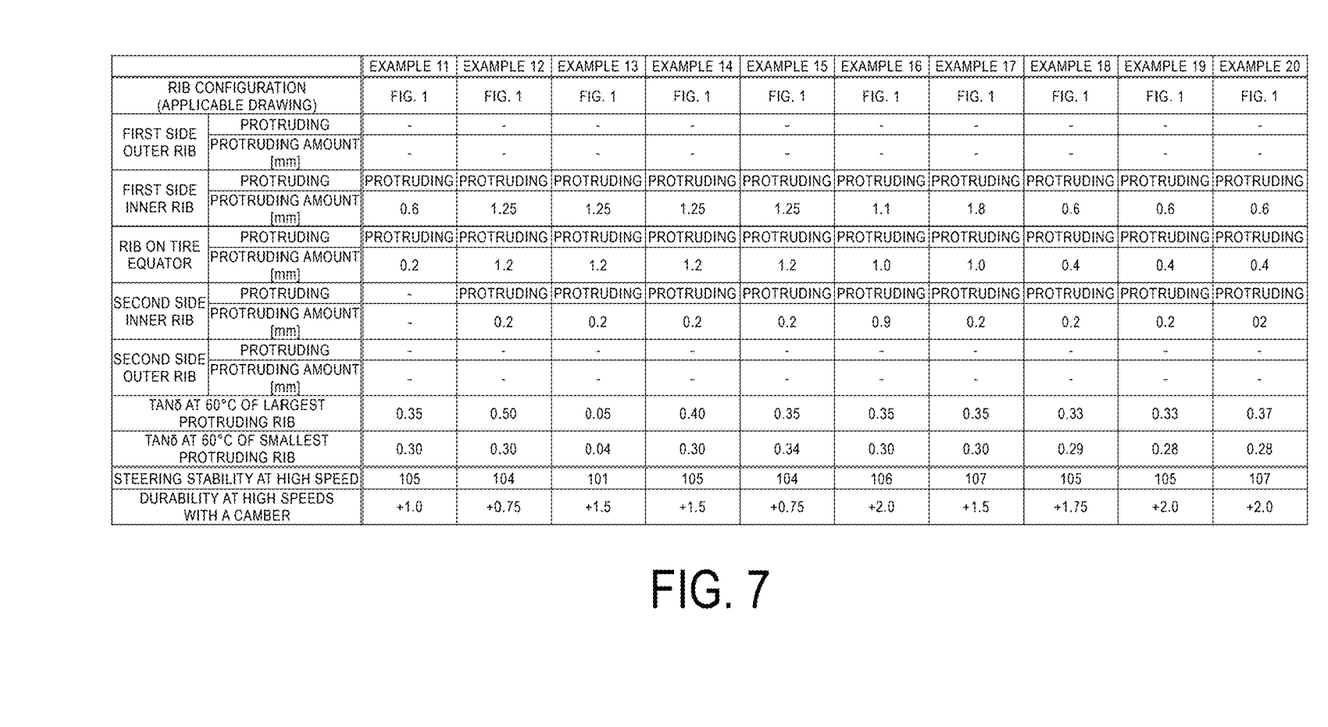
FIGS. 7A-7B is a table showing results of performance tests on pneumatic tires according to examples of the present technology.
Figure 8:
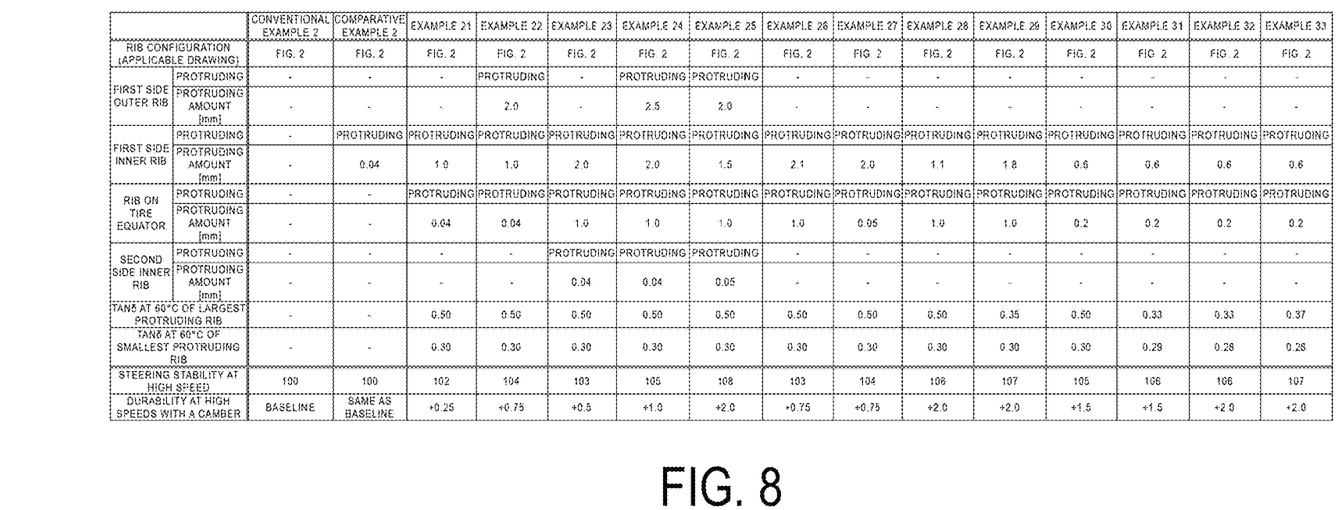
FIGS. 8A-8B is a table showing results of performance tests on pneumatic tires according to examples of the present technology.

FIGS. 6 to 8 are tables showing results of performance testing of pneumatic tires according to examples of the present technology. In the examples, various types of pneumatic tires with different conditions were tested for performance relating to steering stability at high speeds (steering stability when travelling at high speeds), and durability at high speeds with a camber (durability when travelling at high speeds with a camber).

In the tests, pneumatic tires of tire size 295/35R21 were used as the test tires.

The steering stability at high speeds was evaluated using the following method:

the above-described test tires were assembled on 21×10 J rims, inflated to an air pressure of 260 kPa, then mounted to a test vehicle (passenger vehicle with an engine displacement of 4800 cc). Next, the test vehicle was driven on a test course with a dry road surface, and sensory evaluation was carried out by an experienced test driver regarding steering characteristics when changing lanes and cornering and stability when driving straight. The sensory evaluations were expressed as an index with a pneumatic tire of the conventional example as the standard (100). A greater index value indicates superior steering stability.

The durability at high speeds with a camber was evaluated using the following method:

the above-described test tires were assembled on 21×10 J rims and inflated to an air pressure of 340 kPa; a load of 7.65 kN was applied; and a camber angle of −2.7 degrees (the first side corresponding to the vehicle outer side and the second side corresponding to the vehicle inner side when mounted to a vehicle), or a camber angle of +2.7 degrees (the first side corresponding to the vehicle inner side and the second side corresponding to the vehicle outer side when mounted to a vehicle) was applied, the test tires were run on a durability testing drum while in accordance with the speed steps, and the speed at which the test tire failed was measured. The pneumatic tires were evaluated based on how many steps above or below the pneumatic tire of the conventional example the test tire achieved. Here, +1 step means the test tire cleared running for 20 min at +10 km/h, and +0.5 step means the test tire cleared running for 10 min at +10 km/h.

Step 0: running time=0 min, speed=0 km/h
Step 1: running time=1 min, speed=0 to 190 km/h
Step 2: running time=5 min, speed=190 km/h
Step 3: running time=5 min, speed=240 km/h
Step 4: running time=10 min, speed=250 km/h
Step 5: running time=10 min, speed=260 km/h
Step 6: running time=10 min, speed=270 km/h
Step 7: running time=20 min, speed=280 km/h
Step 8: running time=20 min, speed=290 km/h
Step 9: running time=20 min, speed=300 km/h
Step 10: running time=20 min, speed=310 km/h Thereafter, speed was increased by +1 step (+10 km/h, running time of 20 min) until tire failure.

The rib configuration illustrated in FIG. 1 was used for the examples indicated in FIGS. 6A-6B and FIGS. 7A-7B. Here, the outermost rib in the tire width direction corresponds to a first side outer rib, a rib adjacent to the first side outer rib on the inner side in the tire width direction corresponds to a first side inner rib, a rib disposed at the tire equatorial plane adjacent to the first side inner rib on the inner side in the tire width direction corresponds to a tire equatorial plane rib, a rib adjacent to the tire equatorial plane rib disposed on the second side corresponds to the second side inner rib, and the outermost rib adjacent to the second side inner rib on the outer side in the tire width direction corresponds to a second side outer rib.

The pneumatic tire of Conventional Example 1 indicated in FIGS. 6A-6B and FIGS. 7A-7B has no protruding ribs. The pneumatic tire of Comparative Example 1 has a protruding rib only at the tire equatorial plane. On the other hand, the pneumatic tires of Examples 1 to 20 indicated in FIGS. 6A-6B and FIGS. 7A-7B have at least two ribs that protrude to the outer side in the tire radial direction beyond the profile line of the tread surface when viewed in the tire meridian cross section. The protruding amount decreases in order from the first side to the second side in the tire width direction. The loss tangent tan δ at 60° C. of the compound of the cap tread is smaller in the region of the rib where the protruding amount is the least than that in the region of the rib where the protruding amount is the greatest. In addition, the pneumatic tires of Example 8 and Example 10 to Example 20 have ribs with a protruding amount of from 0.05 mm to 2.0 mm, both inclusive. The pneumatic tires of Example 11 and Example 16 to Example 20 have a difference between protruding amounts of the adjacent ribs of from 0.1 mm to 0.8 mm, both inclusive. The pneumatic tires of Example 1 to Example 3, and Example 9 to Example 20 have ribs that protrude beyond the profile line disposed between circumferential grooves. Also, in the pneumatic tire of Example 14 to Example 20, the loss tangent tan δ at 60° C. of the compound in the region where the rib has the greatest protruding amount is from 0.05 to 0.4, both inclusive, and the loss tangent tan δ in the region of the rib where the protruding amount is the least is from 0.2 to 0.5, both inclusive.

The rib configuration illustrated in FIG. 2 was used for the examples indicated in FIGS. 8A-8B. Here, the outermost rib in the tire width direction corresponds to a first side outer rib, a rib adjacent to the first side outer rib on the inner side in the tire width direction corresponds to a first side inner rib, a rib adjacent to the first side inner rib disposed on the second side corresponds to a second side inner rib, and the outermost rib adjacent to the second side inner rib on the outer side in the tire width direction corresponds to a second side outer rib.

The pneumatic tire of Conventional Example 2 indicated in FIGS. 8A-8B has no protruding ribs. The pneumatic tire of Comparative Example 2 only has the first side inner rib as a protruding rib. The pneumatic tires of Examples 21 to 33 indicated in FIGS. 8A-8B have at least two ribs that protrude to the outer side in the tire radial direction beyond the profile line of the tread surface when viewed in the tire meridian cross section. The protruding amount decreases in order from the first side to the second side in the tire width direction. The loss tangent tan δ at 60° C. of the compound of the cap tread is smaller in the region of the rib where the protruding amount is the least than that in the region of the rib where the protruding amount is the greatest. In addition, the pneumatic tires of Example 25 and Example 27 to Example 33 have ribs with a protruding amount of from 0.05 mm to 2.0 mm, both inclusive. The pneumatic tires of Example 29 to Example 33 have a difference between protruding amounts of the adjacent ribs of from 0.1 mm to 0.8 mm, both inclusive. The pneumatic tires of Example 21 and Example 26 to Example 33 have ribs that protrude beyond the profile line disposed between circumferential grooves. Also, in the pneumatic tire of Example 29 and Example 31 to Example 33, the loss tangent tan δ at 60° C. of the compound in the region where the rib has the greatest protruding amount is from 0.05 to 0.4, both inclusive, and the loss tangent tan δ in the region of the rib where the protruding amount is the least is from 0.2 to 0.5, both inclusive.

As is seen by the test results shown in FIGS. 6A to 8B, the pneumatic tires of Examples 1 to 33 had enhanced steering stability at high speeds and durability at high speeds with a camber.

The invention claimed is:

1. A pneumatic tire comprising: at least four ribs extending in a tire circumferential direction, defined and formed by at least three circumferential grooves extending in the tire circumferential direction in a tread portion thereof,
   at least two of the at least four ribs including one of the at least four ribs disposed on a first side of a tire equatorial plane in a tire width direction and another one of the at least four ribs disposed on a second side thereof, at least three of the at least four ribs protruding to an outer side in a tire radial direction beyond a profile line of a tread surface when viewed in a meridian cross section, the protruding amounts of the at least three of the at least four ribs decreasing in order from the first side towards the second side in the tire width direction,
   a cap tread forming a tread surface of the tread portion is composed from different types of compounds, and a loss tangent tan δ at 60° C. of one of the compounds in a region where the rib has the least protruding amount is smaller than a loss tangent tan δ of another one of the compounds in a region of the rib where the protruding amount is the greatest, the ribs protruding beyond the profile line are provided adjacent to one another interposed by one of the circumferential grooves, and the difference between the protruding amounts of the adjacent ribs is from 0.4 mm to 0.8 mm, both inclusive.

2. The pneumatic tire according to claim 1, wherein the protruding amount from the profile line of each of the at least three of the at least four ribs is from 0.05 mm to 2.0 mm, both inclusive.

3. The pneumatic tire according to claim 2, wherein the loss tangent tan δ at 60° C. of the compound in the region where the rib has the greatest protruding amount is from 0.25 to 0.4, both inclusive, and the loss tangent tan δ in the region of the rib where the protruding amount is the least is from 0.2 to 0.33, both inclusive.

4. The pneumatic tire according to claim 3, wherein a vehicle inner/outer side orientation when mounted to a vehicle is designated, the protruding amounts decreases in order from the vehicle outer side to the vehicle inner side, and the loss tangent tan δ at 60° C. of the compound is smaller on the vehicle inner side than the vehicle outer side.

5. The pneumatic tire according to claim 2, wherein a vehicle inner/outer side orientation when mounted to a vehicle is designated, the protruding amounts decreases in order from the vehicle outer side to the vehicle inner side, and the loss tangent tan δ at 60° C. of the compound is smaller on the vehicle inner side than the vehicle outer side.

6. The pneumatic tire according to claim 1, wherein the loss tangent tan δ at 60° C. of the compound in the region where the rib has the greatest protruding amount is from 0.25 to 0.4, both inclusive, and the loss tangent tan δ in the region of the rib where the protruding amount is the least is from 0.2 to 0.33, both inclusive.

7. The pneumatic tire according to claim 1, wherein a vehicle inner/outer side orientation when mounted to a vehicle is designated, the protruding amounts decreases in order from the vehicle outer side to the vehicle inner side, and the loss tangent tan δ at 60° C. of the compound is smaller on the vehicle inner side than the vehicle outer side.

8. The pneumatic tire according to claim 1, wherein at least four of the at least four ribs protrude to the outer side in the tire radial direction beyond the profile line of the tread surface when viewed in the meridian cross section, the protruding amounts of the at least four ribs decreasing in order from the first side towards the second side in the tire width direction.

9. The pneumatic tire according to claim 1, wherein the cap tread forming the tread surface of the tread portion is composed from at least three different types of compounds.

10. The pneumatic tire according to claim 9, wherein boundaries between the at least three different types of compounds is disposed on ribs that do not correspond to the rib having the least protruding amount or the rib where the protruding amount is the greatest.

11. The pneumatic tire according to claim 10, wherein the at least four ribs protrude to the outer side in the tire radial direction beyond the profile line of the tread surface when viewed in the meridian cross section, the protruding amounts of the at least four ribs decreasing in order from the first side towards the second side in the tire width direction.

12. The pneumatic tire according to claim 1, wherein a boundary between the different types of compounds is disposed on ribs that do not correspond to the rib having the least protruding amount or the rib where the protruding amount is the greatest.

13. The pneumatic tire according to claim 1, wherein the protruding amount from the profile line of each of the at least three of the at least four ribs is from 0.05 mm to 0.09 mm, both inclusive.

14. The pneumatic tire according to claim 1, wherein the protruding amount from the profile line of each of the at least three of the at least four ribs is from 1.6 mm to 2.0 mm, both inclusive.

* * * * *